United States Patent
Kim et al.

(10) Patent No.: US 8,674,242 B2
(45) Date of Patent: Mar. 18, 2014

(54) LAUNDRY WEIGHT SENSING METHOD USING COUNTER ELECTROMOTIVE FORCE OF MOTOR

(75) Inventors: Sung Hoon Kim, Seongnam-si (KR); Sang Yeon Pyo, Suwon-si (KR); Jae Ryong Park, Hwaseong-si (KR); See Young Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 393 days.

(21) Appl. No.: 12/929,214

(22) Filed: Jan. 7, 2011

(65) Prior Publication Data
US 2011/0192655 A1    Aug. 11, 2011

(30) Foreign Application Priority Data
Feb. 5, 2010 (KR) .......................... 10-2010-0011082

(51) Int. Cl.
| | |
|---|---|
| G01G 19/00 | (2006.01) |
| D06F 33/00 | (2006.01) |
| G01G 19/52 | (2006.01) |
| G01P 15/00 | (2006.01) |
| G01P 3/00 | (2006.01) |

(52) U.S. Cl.
USPC ................... 177/1; 177/245; 68/12.04; 8/158

(58) Field of Classification Search
USPC ............................ 177/1, 245; 68/12.04; 8/158
See application file for complete search history.

(56) References Cited

U.S. PATENT DOCUMENTS

| | | | |
|---|---|---|---|
| 4,862,710 A * | 9/1989 | Torita et al. ................... | 68/12.01 |
| 5,144,819 A | 9/1992 | Hiyama et al. | |
| 5,230,228 A | 7/1993 | Nakano et al. | |
| 7,478,547 B2 * | 1/2009 | Okazaki et al. .............. | 68/12.04 |
| 7,484,258 B2 * | 2/2009 | Kim et al. .......................... | 8/158 |
| 8,420,957 B2 * | 4/2013 | Berti ................................ | 177/1 |
| 8,489,358 B2 * | 7/2013 | Petronilho et al. ............ | 702/145 |
| 2003/0009832 A1 * | 1/2003 | Yang et al. ......................... | 8/159 |
| 2005/0015890 A1 * | 1/2005 | Kim et al. .......................... | 8/158 |
| 2006/0021392 A1 * | 2/2006 | Hosoito et al. ............... | 68/12.04 |
| 2008/0041115 A1 * | 2/2008 | Kanazawa et al. ........... | 68/12.04 |
| 2013/0125595 A1 * | 5/2013 | Seo et al. ...................... | 68/12.04 |

FOREIGN PATENT DOCUMENTS

| | | |
|---|---|---|
| JP | 10-225589 | 8/1998 |
| KR | 2000-0043400 | 7/2000 |
| KR | 10-2005-0023963 | 3/2005 |

OTHER PUBLICATIONS

Russian Office Action dated Apr. 26, 2012 issued in corresponding Russian Patent Application No. 2011103056.

* cited by examiner

*Primary Examiner* — Randy W Gibson
(74) *Attorney, Agent, or Firm* — Staas & Halsey LLP

(57) ABSTRACT

A laundry weight sensing method. A motor is consecutively turned on and off plural times, the number of pulses output from a counter electromotive force detector according to counter electromotive force of the motor when the motor is finally turned off is counted, and a laundry weight is sensed using the counted number of pulses.

17 Claims, 13 Drawing Sheets

FIG. 4 – Related Art

LAUNDRY WEIGHT SENSING METHOD USING COUNTER ELECTROMOTIVE FORCE OF MOTOR

CROSS-REFERENCE TO RELATED APPLICATIONS

This application claims the benefit of Korean Patent Application No. 2010-011082, filed on Feb. 5, 2010 in the Korean Intellectual Property Office, the disclosure of which is incorporated herein by reference.

BACKGROUND

1. Field

Embodiments relate to a laundry weight sensing method.

2. Description of the Related Art

In general, a washing machine using a pulsator washes laundry using a water current generated according to rotation of the pulsator.

Performance of the washing machine is basically determined by detergency. However, if the amount of water used for washing is increased, a considerable time is required for water supply and drainage, a washing time is increased, and energy consumption is increased. Therefore, the amount of water used for washing becomes a main factor for determining the performance of a washing machine.

As a washing machine able to reduce the amount of water used for washing has been attracting considerable attention, a washing machine in which the shape and structure of a pulsator to generate a water current are changed has been developed.

In a washing machine, sensing of a laundry weight influences reduction in water consumption.

SUMMARY

Therefore, it is an aspect to improve a laundry weight sensing method so as to improve weight sensing performance.

Additional aspects will be set forth in part in the description which follows and, in part, will be apparent from the description, or may be learned by practice of the invention.

In accordance with one aspect, there is provided a laundry weight sensing method including: performing an operation to drive a motor to drive a pulsator in an initial stoppage state up to a maximum rate of rotation, to turn off the motor so as to inertially rotate the motor, to drive the motor again before a rate of rotation of the motor reaches 0; and to turn off the motor again before the rate of rotation of the motor reaches a maximum rate of rotation so as to inertially rotate the motor until the motor is stopped, wherein laundry weight is sensed using counter electromotive force generated when the motor is turned off again.

The sensing of the laundry weight using the counter electromotive force may be performed by estimating the laundry weight using a count of the number of pulses indicating the counter electromotive force generated when the motor is finally turned off.

In the driving of the motor to drive the pulsator in the initial stoppage state up to the maximum rate of rotation, a motor driving time may be determined at no load.

The driving of the motor again when the rate of rotation reaches 0 may include driving the motor again before the rate of rotation of the motor reaches 0 at full load.

In the turning off of the motor again before the rate of rotation of the motor reaches the maximum rate of rotation, a determination as to whether the rate of rotation of the motor is the maximum rate of rotation may be made at no load.

The driving of the motor again before the rate of rotation of the motor reaches 0 and the inertial rotation of the motor may be performed plural times, and the motor may be finally turned off so as to inertially rotate the motor until the motor is stopped, and the laundry weight may be sensed using counter electromotive force generated when the motor is finally turned off.

The number of pulses indicating the counter electromotive force generated when the motor is finally turned off may be counted, and the laundry weight may be estimated using an accumulated count obtained by accumulating the numbers of pulses counted when repeatedly performing the operation predetermined times.

A motor rotation direction may be changed when the operation is repeatedly performed the predetermined times.

In accordance with another aspect, there is provided a laundry weight sensing method including: performing an operation to drive a motor to rotate a pulsator in an initial stoppage state up to a maximum rate of rotation and to repeatedly turn on and off the motor plural times while maintaining a rate of rotation of the motor within a predetermined range; and sensing laundry weight using counter electromotive force generated by the motor when the motor is finally turned off.

The sensing of the laundry weight using the counter electromotive force may include estimating the laundry weight using a count of the number of pulses indicating the counter electromotive force generated when the motor is finally turned off.

In the maintenance of the rate of rotation of the motor within the predetermined range, the rate of rotation of the motor may be maintained between the maximum rate of rotation and 0 at any load.

In the maintenance of the rate of rotation of the motor within the predetermined range, the motor may be controlled to be driven such that the rate of rotation of the motor is equal to or less than the maximum rate of rotation at no load.

In the maintenance of the rate of rotation of the motor within the predetermined range, the motor may be controlled to be driven such that the rate of rotation of the motor is equal to or greater than 0 at full load.

The number of pulses indicating the counter electromotive force generated when the motor is finally turned off may be counted, and the laundry weight may be estimated using an accumulated count obtained by accumulating the numbers of pulses counted when repeatedly performing the operation predetermined times.

A motor rotation direction may be changed when the sensing of the operation is repeatedly performed the predetermined times.

According to the embodiments, a counter electromotive force difference generated by a motor according to laundry weights is increased so as to accurately sense laundry weight. Therefore, weight sensing performance is improved.

BRIEF DESCRIPTION OF THE DRAWINGS

These and/or other aspects of the invention will become apparent and more readily appreciated from the following description of the embodiments, taken in conjunction with the accompanying drawings of which:

BRIEF DESCRIPTION OF THE DRAWINGS

Figure 1:
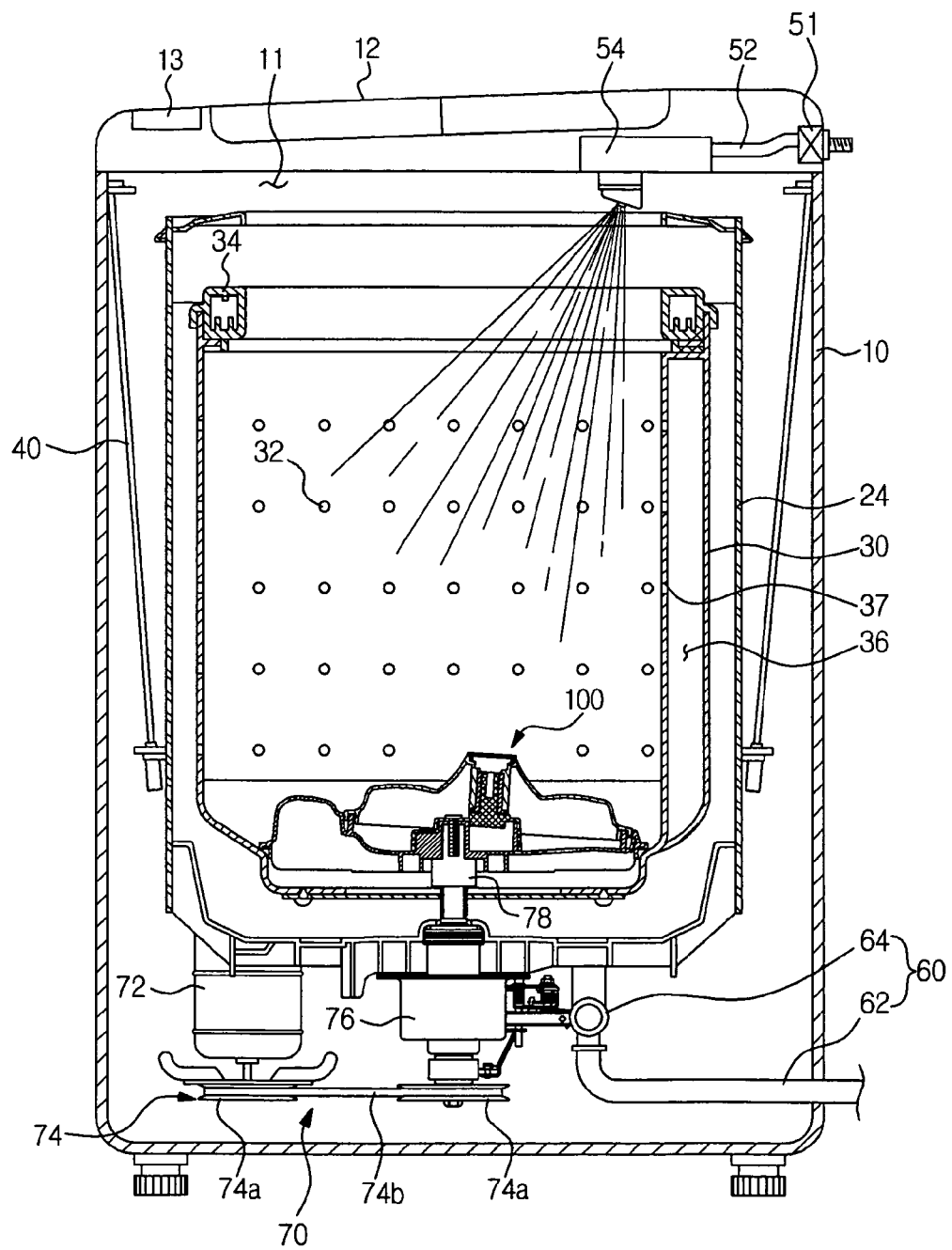
Figure 2:
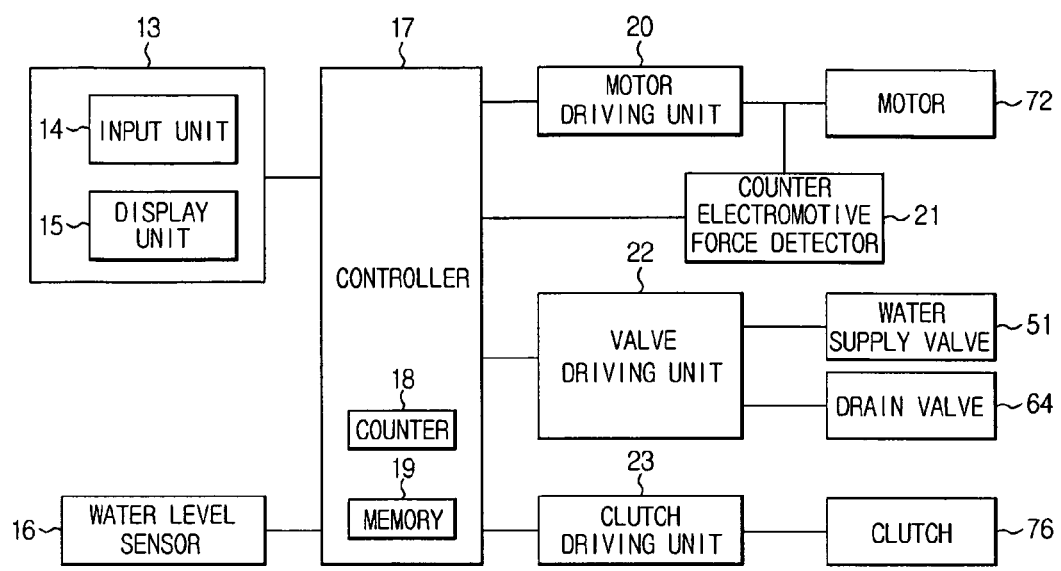
Figure 3:
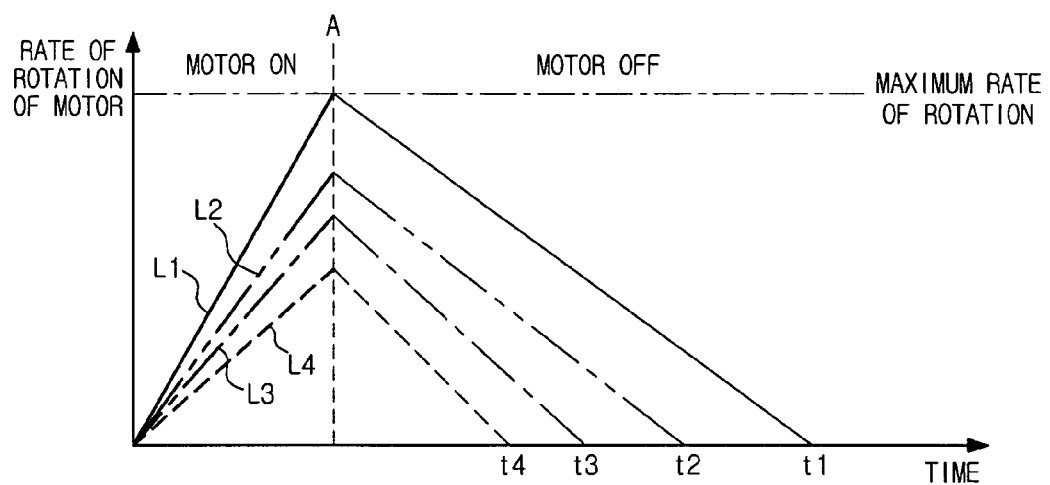
Figure 4:
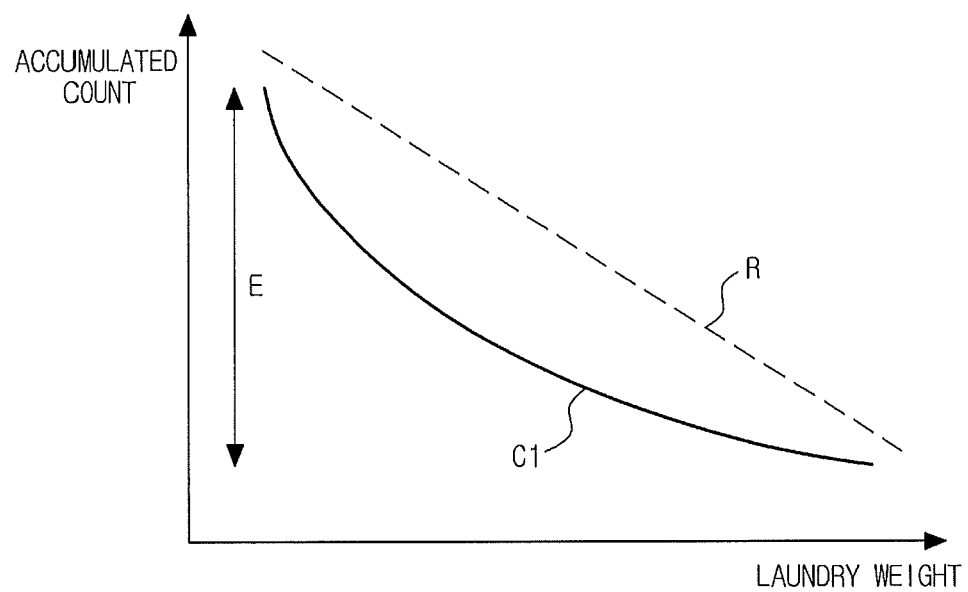
Figure 5:
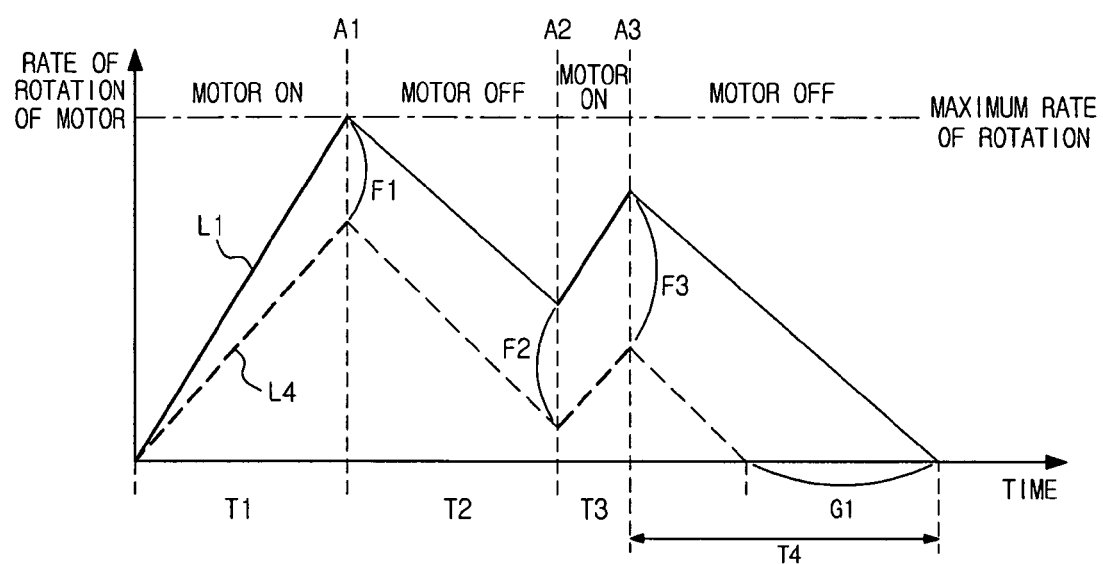
Figure 6:
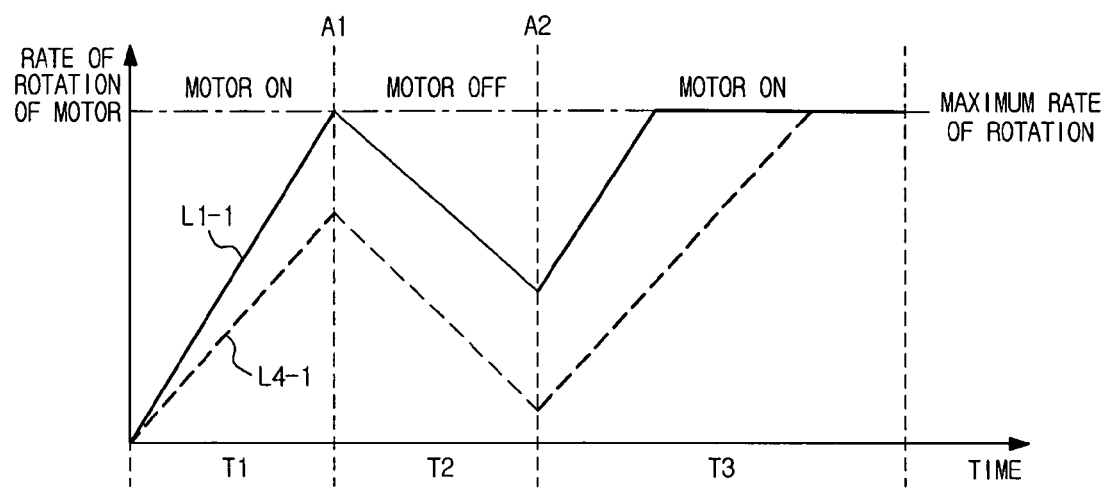
Figure 7:
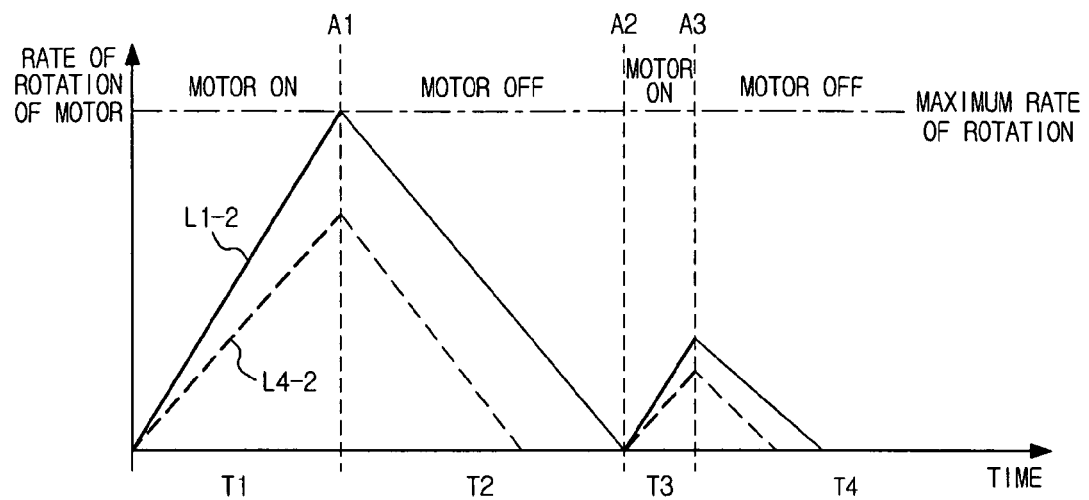
Figure 8:
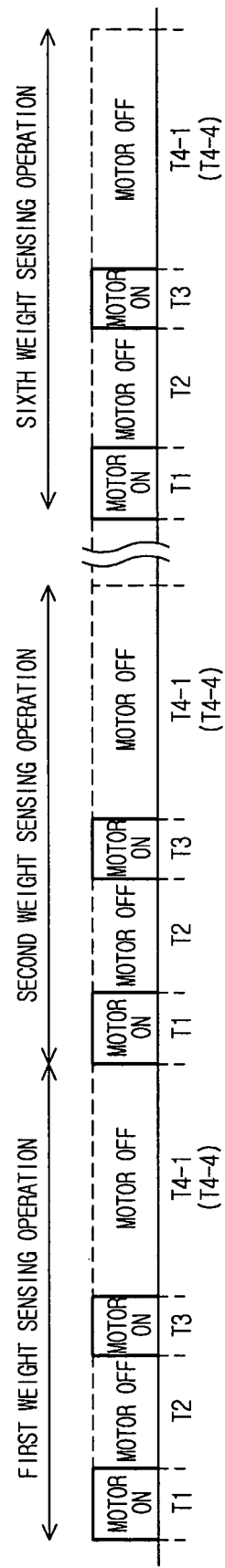
Figure 9:
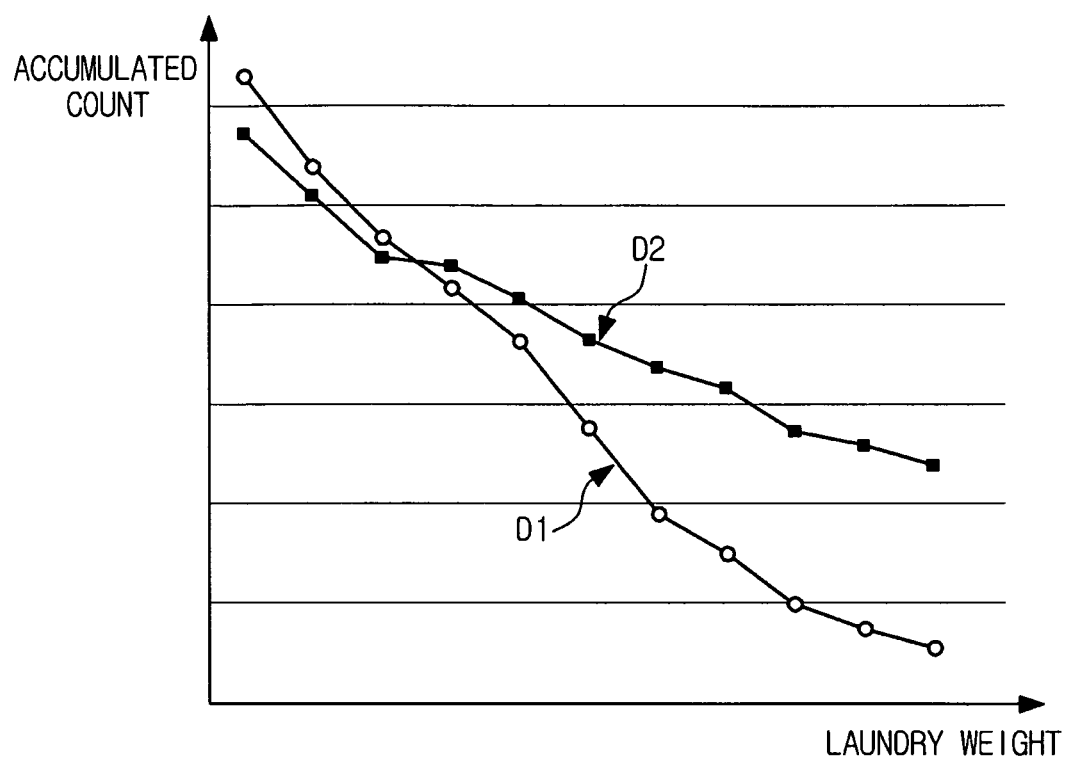
Figure 10:
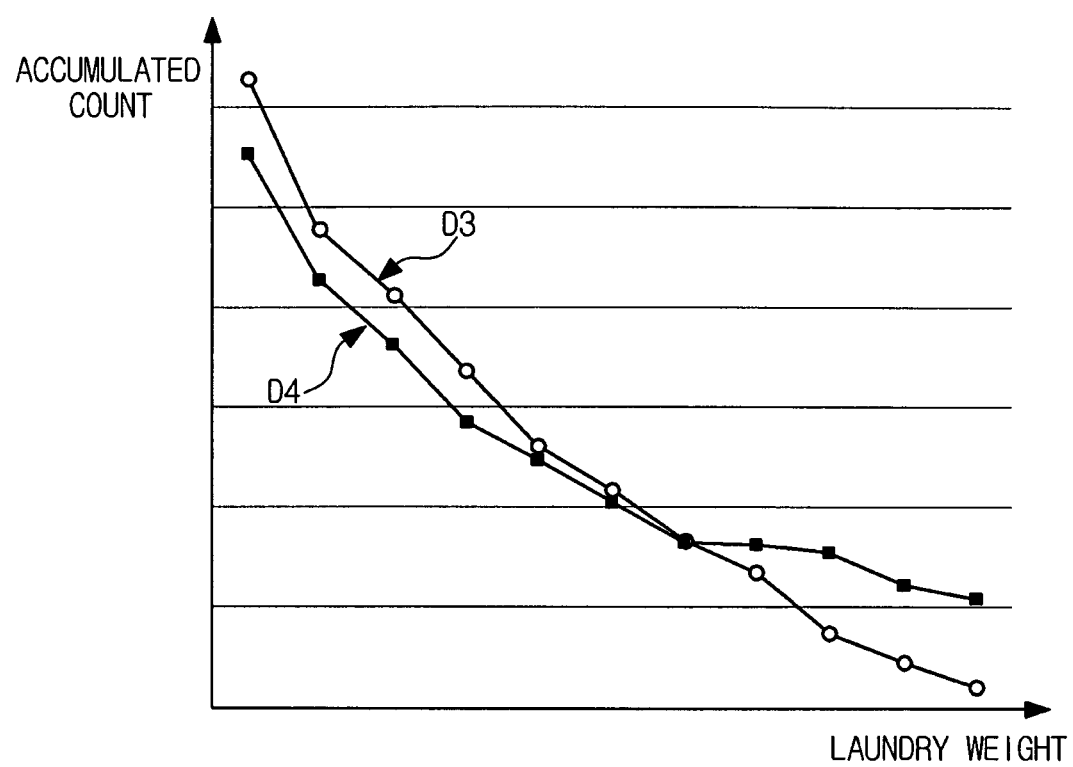
Figure 11:
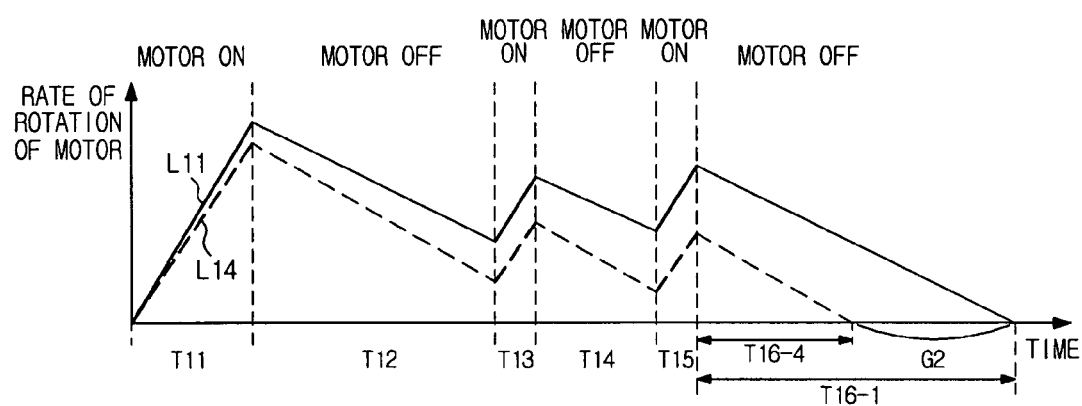
Figure 12:
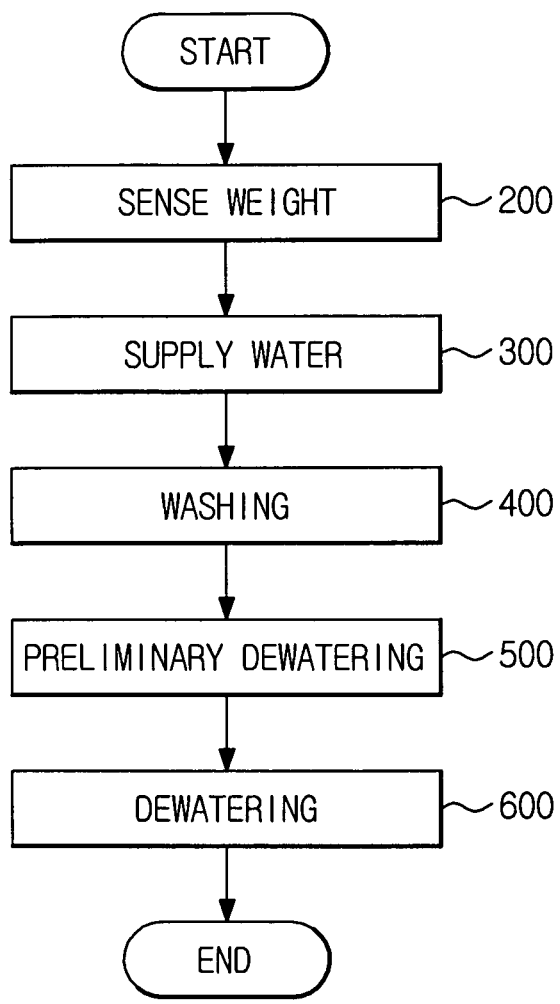
Figure 13:
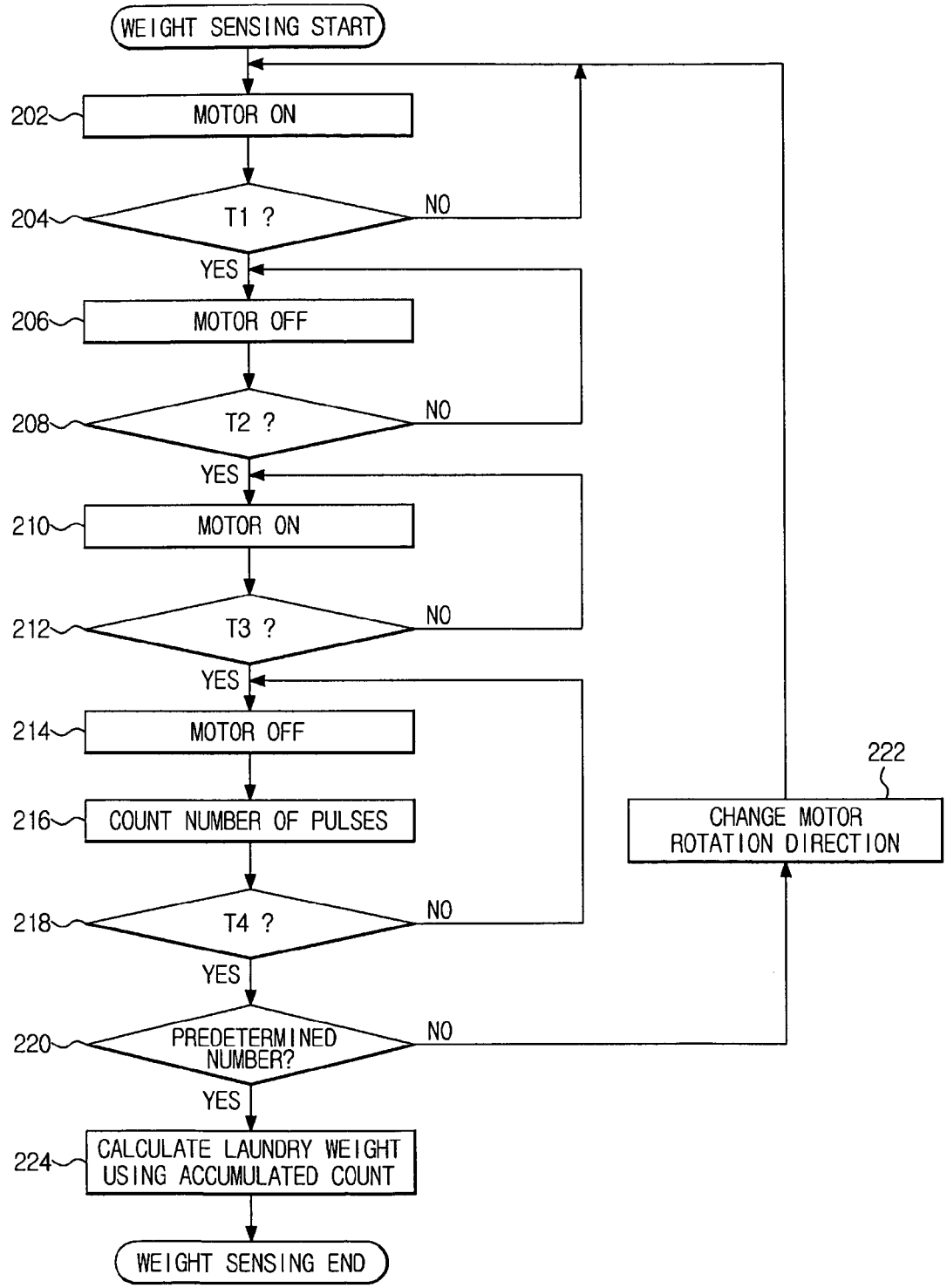

FIG. 1 is a diagram showing a washing machine having an obliquely mounted pulsator;

FIG. 2 is a control block diagram of the washing machine of FIG. 1;

FIG. 3 is a graph illustrating a rate of rotation of a motor changed according to laundry weights when a laundry weight sensing method of the related art is applied;

FIG. 4 is a graph illustrating weight sensing performance indicated by the number of pulses indicating counter electromotive force of a motor which is changed according to laundry weights when a laundry weight sensing method of the related art is applied;

FIG. 5 is a graph illustrating a rate of rotation of a motor changed according to laundry weights when a laundry weight sensing method according to an embodiment of the present invention is applied;

FIGS. 6 and 7 are graphs illustrating motor control in a laundry weight sensing method according to an embodiment of the present invention, wherein FIG. 6 shows the case where a third control motor period, in which a rate of rotation of a motor is increased by driving a motor again, is set to be extremely large and FIG. 7 shows the case where a second control motor period, in which a rate of rotation of a motor is decreased by rotation inertia, is set to be extremely large;

FIG. 8 is a diagram illustrating an operation to repeatedly sense a laundry weight in a laundry weight sensing method according to an embodiment of the present invention;

FIG. 9 is a graph illustrating weight sensing performance obtained by experimentation in which a laundry weight sensing method according to an embodiment of the present invention and a laundry weight sensing method of the related art are applied to a washing machine having an obliquely mounted pulsator;

FIG. 10 is a graph illustrating weight sensing performance obtained by experimentation in which a laundry weight sensing method according to an embodiment of the present invention and a laundry weight sensing method of the related art are applied to a washing machine having a horizontally mounted pulsator;

FIG. 11 is a graph illustrating a rate of rotation of a motor changed according to laundry weights when a laundry weight sensing method according to another embodiment of the present invention is applied;

FIG. 12 is a flowchart illustrating an overall control operation of a washing machine according to an embodiment of the present invention; and FIG. 13 is a flowchart illustrating a laundry weight sensing method according to an embodiment of the present invention.

DETAILED DESCRIPTION

Reference will now be made in detail to the embodiments, examples of which are illustrated in the accompanying drawings.

FIG. 1 is a diagram showing a washing machine according to an embodiment.

As shown in FIG. 1, the washing machine 1 includes a cabinet 10 forming an appearance thereof, a tub 24 placed within the cabinet 10, a rotatable tub 30 placed within the tub 24, and a pulsator 100 placed within the rotatable tub 30 to generate a water current.

An opening 11 used to insert laundry into the rotatable tub 30 is formed in an upper side of the cabinet 10. The opening 11 is opened or closed by a door 12 mounted on the cabinet 10.

A control panel 13 to receive a user command and to display an operation state is provided on the upper side of the cabinet 10.

The tub 24 is supported in the cabinet 10 by a suspending device 40 to connect a lower side of an outer surface of the tub 24 and an upper side of an inner surface of the cabinet 10.

A water supply pipe 52 to supply wash water into the tub 24 is mounted above the tub 24. One side of the water supply pipe 52 is connected to an external water supply source (not shown) through a water supply valve 51, and the other side of the water supply pipe 52 is connected to a detergent supply device 54. Water supplied through the water supply pipe 52 is supplied into the tub 24 through the detergent supply device 54 together with detergent.

A drain device 60 to drain wash water contained in the tub 24 to the outside of the washing machine 1 is mounted below the tub 24. The drain device 60 may include a drainpipe 62 connected to a lower side of the tub 24 and a drain valve 64 mounted on the drainpipe 62. A drain pump (not shown) to forcibly drain the wash water from the tub 24 may be mounted in the drainpipe 62.

The rotatable tub 30 is a cylindrical-shaped tub having an opened upper side, and has a plurality of holes 32 formed in a side surface thereof. A balancer 34 may be mounted on the rotatable tub 30 such that the rotatable tub 30 is stably rotated at a high speed. A pumping duct 36 is mounted on an inner surface of the rotatable tub 30 such that the wash water is circulated in the rotatable tub 30. A drain hole 37 to drain the wash water is formed in the pumping duct 36.

A driving device 70 is mounted below the tub 24. The driving device 70 includes a motor 72, a power transmission device 74, a clutch 76 and a driving shaft 78. The driving shaft 78 is coupled to the pulsator 100 so as to transmit power of the motor 72 to the pulsator 100.

The power of the motor 72 is transmitted to the clutch 76 through the power transmission device 74. The power transmission device 74 may include pulleys 74a and a belt 74b to connect the pulleys 74a. The clutch 76 intermittently transmits the power of the motor 72 so as to rotate the rotatable tub 30 and the pulsator 100 or to rotate pulsator 100 in a state in which the rotatable tub 30 is stopped.

The pulsator 100 is obliquely mounted with respect to a horizontal direction. The mount structure of the pulsator 100 is not limited thereto, and the pulsator 100 may be horizontally mounted so as to be rotated together with the rotatable tub 30 or to be rotated in a state in which the rotatable tub 30 is stopped according to the operation of the clutch 76.

FIG. 2 is a control block diagram of a washing machine according to an embodiment.

The control panel 13 may include an input unit 14 and a display unit 15. The input unit 14 includes a plurality of buttons to receive a user command, and the display unit 15 may include a plurality of lamps or light emitting diodes to display an operation state or a setting state of the washing machine.

A water level sensor 16 senses the level of water filled in the tub 24 and provides the water level to a controller 17.

The controller 17 outputs a valve control signal to a valve driving unit 22 in order to open or close the water supply valve 51 or open or close the drain valve 64 for water supply or drainage. The valve driving unit 22 may open or close the water supply valve 51 according to the valve control signal of the controller 17. The valve driving unit 22 may open or close the drain valve 64 according to the valve control signal of the controller 17.

The controller 17 outputs, to a motor driving unit 20, a motor control signal to drive the motor 72 in operation modes to perform a laundry weight sensing operation, a washing cycle and a dewatering cycle.

The motor driving unit 20 may connect or disconnect power supply to or from the motor 72 according to the motor control signal so as to turn the motor on or off.

As the motor 72, a single-phase induction motor which reaches a maximum rate of rotation when a predetermined time is passed after power supply may be used.

The controller 17 outputs, to a clutch driving unit 23, a clutch control signal to control the clutch 76 to intermittently transmit the power of the motor 72. The clutch driving unit 23 drives the clutch 76 according to the clutch control signal so as to rotate the rotatable tub 30 and the pulsator 100 or to rotate the pulsator 100 in a state in which the rotatable tub 30 is stopped.

When counter electromotive force is generated by the motor 72, a counter electromotive force detector 21 outputs pulses according to the counter electromotive force. That is, when the motor 72 is turned off, counter electromotive force current generated by the motor 72 is attenuated by rotation inertia in the form of a sine wave. At this time, the counter electromotive force detector 21 forms rectangular pulses based on zero crossing (0 volt) of the sine wave and provides the rectangular pulses to the controller 17.

As the counter electromotive force detector 21, a photo coupler may be used.

When laundry is inserted into the tub 24 to begin a washing cycle, the controller 17 may perform a laundry weight sensing mode before supplying water so as to calculate a laundry weight and determine a water supply amount, a washing time and a dewatering time based on the calculated laundry weight.

In the laundry weight sensing mode, the controller 17 outputs the motor control signal to the motor driving unit 20 based on motor driving information stored in a memory 19, thereby repeatedly turning on or off the motor 72.

When the motor 72 is turned off, the counter electromotive force detector 21 supplies the rectangular pulses to the controller 17, according to the counter electromotive force current generated by rotation inertia. A counter 18 counts the number of rectangular pulses. The weight sensing operation is repeatedly performed predetermined times, the numbers of rectangular pulses counted when repeatedly performing the weight sensing operation are accumulated, and the laundry weight is calculated by the controller 17 according to the accumulated count. Data about the laundry weight corresponding to the accumulated count is stored in the memory 19 in advance. When the laundry weight is calculated according to the accumulated count, weight calculation accuracy may be improved. However, when the number of repeated weight sensing operations is increased, processing time is increased. Therefore, the number of repeated weight sensing operations is adequately determined by experimentation.

FIG. 3 is a graph illustrating counter electromotive force of a motor changed according to laundry weights when a laundry weight sensing method of the related art is applied.

A first motor rotation rate line L1 indicates a rate of rotation of a motor generated when the motor 72 is consecutively turned on and off in a state in which laundry is not inserted into the tub 24 or a small amount of laundry is inserted into the tub 24, and second to fourth motor rotation rate lines L2, L3 and L4 indicate rates of rotation of the motor generated when the motor 72 is consecutively turned on and off in a state in which a relatively large amount of laundry is inserted into the tub 24. At this time, the laundry weight in the third motor rotation rate line L3 is greater than that in the second motor rotation rate line L2, and the laundry weight in the fourth motor rotation rate line L4 is greater than that in the third motor rotation rate line L3.

In the first motor rotation rate line L1, an initial motor on operation is continuously performed until the rate of rotation of the motor reaches a maximum rate of rotation and the motor 72 is turned off at a time point A when the rate of rotation of the motor reaches the maximum rate of rotation. Thereafter, a state in which the motor 72 is rotated by rotation inertia continues for a predetermined period A to t1 (see FIG. 3). Similarly, in the second to fourth motor rotation rate lines L2, L3 and L4, the motor 72 is turned off upon reaching the time point A after the motor 72 is turned on and this state continues for predetermined times A to t2, A to t3 and A to t4 (see FIG. 3).

When the time is passed after the motor is turned off, the magnitude of the counter electromotive force generated by rotation inertia is reduced. A time required for reducing the magnitude of the counter electromotive force is changed according to laundry weights and the number of pulses output from the counter electromotive force detector 21 is changed according to counter electromotive force current.

In the laundry weight sensing mode, a motor on time continues for a relatively small time (e.g., several hundreds of ms). Although the magnitude of the counter electromotive force is changed according to laundry weights when the motor is turned off, the magnitude of the counter electromotive force is changed in a predetermined range. Therefore, the laundry weight may not be accurately calculated based on the counted number of pulses.

FIG. 4 is a graph illustrating weight sensing performance indicated by the accumulated count obtained by counting and accumulating the numbers of pulses indicating counter electromotive force of a motor which is changed according to laundry weights while repeatedly performing the weight sensing operation when a laundry weight sensing method of the related art is applied.

Reference line R indicates an ideal example in which the accumulated count is linearly decreased as the laundry weight is increased.

Weight sensing performance may be determined by the range and the linearity of the accumulated count according to the laundry weight. Since a time required for stopping the motor by decreasing the rate of rotation of the motor by rotation inertia when the motor is turned off depends on the laundry weight, the range of the accumulated count obtained by counting and accumulating the numbers of pulses generated when the motor is turned off needs to be large in order to accurately sense the laundry weight. When correspondence between the laundry weight and the accumulated count has linearity, sensing reliability of the laundry weight using the accumulated count is high.

A comparative line C1 indicates an example having linearity inferior to the reference line R, which shows the accumulated count when the motor is turned off according to the laundry weight sensing method of the related art. Since the laundry weight is determined based on the accumulated count, when the range E of the accumulated count is narrow as in comparative line C1, weight sensing performance deteriorates.

FIG. 5 is a graph illustrating a rate of rotation of a motor changed according to laundry weights when a laundry weight sensing method according to an embodiment of the present invention is applied.

In FIG. 5, a first motor rotation rate line L1 indicates a rate of rotation of a motor generated when the motor 72 is consecutively turned on and off in a state in which laundry is not inserted into the tub 24 or a small amount of laundry is inserted into the tub 24, and a fourth motor rotation rate line L4 indicates a rate of rotation of a motor generated when the motor 72 is consecutively turned on and off in a state in which a relatively large amount of laundry is inserted into the tub 24.

In the laundry weight sensing method applied to FIG. 5, a difference between times required for attenuating the counter electromotive force according to the laundry weights when the motor is finally turned off is increased by turning on and off the motor 72 and then turning on and off the motor again before the rotation of the motor is stopped. In the laundry weight sensing mode, the laundry weight sensing operations may be repeated predetermined times.

In the laundry weight sensing method of the embodiment of the present invention, a series of processes of turning on the motor on in a first motor control period T1, turning off the motor in a second motor control period T2, turning on the motor in a third motor control period T3, and turning off the motor in a fourth motor control period is performed.

In the first motor control period T1, the motor 72 is turned on in an initial stoppage state such that the rate of rotation of the motor 72 reaches a maximum rate of rotation at no load. The first motor control period T1 may be set in advance according to a measured value obtained through a plurality of experiments in a state in which laundry is not inserted or a small amount of laundry is inserted when using a single-phase induction motor.

In the second motor control period T2, the motor 72 is turned off such that the rate of rotation of the motor 72 is decreased by rotation inertia, and, at this time, the motor is not completely stopped. Since this period is switched to the third motor control period is in a state in which the rate of rotation of the motor does not become 0, this period T2 is designed to be less than a time required for stopping the motor after the motor is driven during the period T1 at full load, and is obtained through experimentation.

In the third motor control period T3, the motor 72 is turned on such that the rate of rotation of the motor is increased. The third motor control period is designed to be less than a time required when the rate of rotation of the motor reaches the maximum rate of rotation when the motor inertially rotated during the period T2 at no load is driven again, and is obtained through experimentation.

In the fourth motor control period T4, the motor 72 is finally turned off such that the rate of rotation of the motor reaches 0.

The first to fourth motor control periods T1 to T4 are adequately set according to motor characteristics, a maximum rate of rotation, and the like. For example, the first motor control period T1 may be set to 300 ms, the second motor control period T2 may be set to 600 ms, the third motor control period T3 may be set to 80 ms, and the fourth motor control period T4 may be set to 1500 ms.

The laundry weight sensing method will be described in detail with reference to FIG. 5.

A motor rotation rate difference F2 between the first motor rotation rate line L1 and the fourth motor rotation rate line L4 according to the laundry weights at a second time point A2 when the motor 72 is turned on again is greater than a motor rotation rate difference F1 between the first motor rotation rate line L1 and the fourth motor rotation rate line L4 according to the laundry weights at a first time point A1 when the motor 72 reaches a maximum rate of rotation, and a motor rotation rate difference F3 at a third time point A3 when the motor is finally turned off is greater than the motor rotation rate difference F2 at the second time point A2.

A difference between times required for stopping the motor by the attenuation of the counter electromotive force when the motor is finally turned off is increased according to laundry weights, and a difference between the numbers of the pulses indicating the counter electromotive force is also increased. That is, a difference G1 between a counter electromotive attenuation time of the first motor rotation rate line L1 and a counter electromotive attenuation time of the fourth motor rotation rate line L4 when the motor is finally turned off is greater than that of the laundry weight sensing method of the related art. As the counter electromotive force difference G1 is increased, the range of the counted number of pulses according to the laundry weight is increased and the counted number of pulses has linearity such that laundry weight sensing performance is improved.

However, in the laundry weight sensing method of the embodiment, the third motor control period T3 is not set to be extremely large. If the third motor control period T3 is set to be greater than the first motor control period T1 as shown in FIG. 6, the motor 72 is finally turned off in a state in which the rate of rotation of the motor 72 reaches the maximum rate of rotation, regardless of the laundry weight. As a result, even when the motor 72 is finally turned off after the passage of the third motor control period T3, the rate of rotation is attenuated from the maximum rate of rotation both in the first motor rotation rate line L1-1 and the fourth motor rotation rate L4-1. Therefore, a counter electromotive force difference is not large and thus discrimination between laundry weights deteriorates.

In addition, in the laundry weight sensing method according to the embodiment, the second motor control period T2 is adequately set such that the motor 72 is not stopped. When the second motor control period T2 is set to be large as shown in FIG. 7, the period is switched to the third motor control period T3 in a state in which the motor is stopped, that is, the rate of rotation of the motor reaches 0, regardless of laundry weight. At this time, since the rate of rotation of the motor is increased from 0 in the first motor rotation rate line L1-2 and the fourth motor rotation rate line L4-2, even when the motor 72 is finally turned off after the passage of the third motor control period T3, the counter electromotive force difference of the motor 72 according to laundry weights is not large.

The laundry weight may be sensed by performing the weight sensing operation once according to the laundry weight sensing method of the embodiment of the present invention in the laundry weight sensing mode. However, in order to further improve weight sensing accuracy, the weight sensing operation may be performed several times according to the laundry weight sensing method of the present embodiment and the laundry weight is sensed using data obtained by accumulating the counted numbers. At this time, since the weight sensing time is increased and laundry damage is increased, the number of operations is adequately set through experimentation. In the embodiment of the present invention, the laundry weight sensing operation is repeatedly performed six times.

In the embodiment, a method of repeatedly performing the weight sensing operation six times as shown in FIG. 8 and accumulating the numbers of pulses counted by the counter 18 when the motor is finally turned off so as to calculate a laundry weight using the accumulated count is applied. As described above, the number of weight sensing operations may be changed as necessary and the information about the number of weight sensing operations may be stored in the memory 19.

FIG. 9 is a graph illustrating weight sensing performance obtained through experimentation in which a laundry weight sensing method according to an embodiment of the present invention and a laundry weight sensing method of the related art are applied to a washing machine having an obliquely mounted pulsator. FIG. 10 is a graph illustrating weight sensing performance obtained through experimentation in which a laundry weight sensing method according to an embodiment and a laundry weight sensing method of the related art are applied to a washing machine having a horizontally mounted pulsator.

By applying the laundry weight sensing method according to the embodiment to the washing machine having the obliquely mounted pulsator, discrimination between weight sensing performances is improved. In FIG. 9, it can be seen that a first experimentation line D1 to which the laundry weight sensing method according to the embodiment is applied has linearity superior to a second experimentation line D2 to which the laundry weight sensing method of the related art is applied. In addition, since the first experimentation line D1 is distributed wider than the second experimentation line D2 in the range of the accumulated count according to the laundry weights, it can be seen that discrimination between laundry weights is accurately recognized using the accumulated count and weight sensing performance is further improved.

By applying the laundry weight sensing method according to the embodiment to the washing machine having the horizontally mounted pulsator, discrimination between weight sensing performances is improved. In FIG. 10, it can be seen that a third experimentation line D3 to which the laundry weight sensing method according to the embodiment of the present invention is applied has linearity superior to a fourth experimentation line D4 to which the laundry weight sensing method of the related art is applied. In addition, since the third experimentation line D3 is distributed wider than the fourth experimentation line D4 in the range of the accumulated count according to the laundry weights, it can be seen that discrimination between laundry weights is accurately recognized using the accumulated count and weight sensing performance is further improved.

FIG. 11 is a graph illustrating a rate of rotation of a motor changed according to laundry weights when a laundry weight sensing method according to another embodiment is applied.

In FIG. 11, a difference between counter electromotive force attenuation times of the motor according to laundry weights when the motor is finally turned off is increased by consecutively turning on and off the motor 72 three times.

In first to sixth motor control periods T11 to T16, a process of turning on the motor, turning off the motor after the passage of a predetermined time T1, and consecutively and repeatedly turning on and off the motor before the motor is stopped is performed.

In the first motor control period T11, the motor is turned on such that the rate of rotation of the motor 72 reaches a maximum rate of rotation. The first motor control period T11 corresponds to the first motor control period T1 of FIG. 5.

In the second and fourth motor control periods T12 and T14, the motor 72 is turned off such that the rate of rotation of the motor 72 is decreased by rotation inertia. The second and fourth motor control periods T12 and T14 correspond to the second motor control period T2 of FIG. 5. As described with reference to FIG. 7, the second and fourth motor control periods T12 and T14 are adequately set such that the motor 72 is not stopped.

In the third and fifth motor control periods T13 and T15, the motor 72 is turned on again such that the rate of rotation of the motor is increased. The third and fourth motor control periods T13 and T15 correspond to the third motor control period T3 of FIG. 5. As described with reference to FIG. 6, the third and fifth motor control periods T13 and T15 is not set to be extremely large, that is, are not set to be greater than the first motor control period T11.

In the fifth motor control period T15, in a state in which a motor rotation rate difference between the first motor rotation rate line L11 and the fourth motor rotation rate lines L14 according to laundry weights is increased, the motor 72 is finally turned off. A difference G2 between a counter electromotive force attenuation time T16-1 of the first motor rotation rate line L11 and a counter electromotive force attenuation time T16-4 of the fourth motor rotation rate line L14 is greater than that of the case of applying the laundry weight sensing method of the related art. Therefore, the range of the accumulated count is increased and the count has linearity such that laundry weight sensing performance is improved. Since a time for turning on and off the motor 72 again is further required compared with FIG. 5, the number of repeated laundry weight sensing operations needs to be adequately set.

Hereinafter, a laundry weight sensing method of a washing machine according to an embodiment will be described with reference to FIGS. 5, 12 and 13. FIG. 12 is a flowchart illustrating an overall control operation of a washing machine according to an embodiment, and FIG. 13 is a flowchart illustrating a laundry weight sensing method according to an embodiment.

A user inserts laundry into the tub 24 and inputs a user washing command through the input unit 14 of the control panel 13. Then, the controller 17 switches a mode to a laundry weight sensing mode, performs, predetermined times, the laundry sensing operation to drive the motor 72 and to count the number of pulses output from the counter electromotive force detector 21 when the motor 72 is finally turned off by the counter 18 of the controller 17 according to the laundry sensing method of the embodiment, accumulates the counted numbers, and calculates a laundry weight according to the accumulated count (200).

Then, the controller 17 determines the amount of supplied water based on the calculated laundry weight, and opens the water supply valve 51 so as to supply water into the tub 24 (300).

When water supply is completed, the controller 17 determines a driving condition of the motor 72 to be applied to a washing cycle and a rinsing cycle based on the calculated laundry weight. The driving condition of the motor 72 includes a reversing period of a motor rotation direction, an on and off time according to a rotation direction, a repeated number, and a motor driving time. The motor 72 is driven by a predetermined driving ratio so as to rotate the pulsator 100 and the rotatable tub 30 such that the washing cycle and the rinsing cycle are performed (400).

When the washing cycle is completed, the controller 17 determines the driving condition of the motor 72 based on the calculated laundry weight such that the driving condition is applied to a preliminary dewatering cycle to disentangle tangled laundry. The driving condition of the motor 72 includes a reversing period of a motor rotation direction, an on and off time according to a rotation direction, and a motor driving time (500).

When the preliminary dewatering cycle is completed, the controller 17 rotates the motor 72 in one direction and performs a dewatering cycle according to the driving condition based on the laundry weight (600).

Referring to FIG. 13, the controller 17 turns on the motor 72 in the laundry weight sensing mode such that the motor rotates in one direction (202). When the motor on time passes the first motor control period T1 (Yes in Operation 204), the controller 17 turns off the motor 72 (206) and, when the motor off time passes the second motor control period T2 (Yes in Operation 208), the controller 17 turns on the motor 72 again (210).

Then, when the motor on time passes the third motor control period T3 (Yes in Operation 212), the controller 17 finally turns off the motor 72 (214). When the motor is finally turned off, the counter 18 of the controller 17 counts the pulses indicating the counter electromotive force current (216).

If a time required for counting the pulses when the motor is finally turned off passes the fourth motor control period T4 (Yes 218), the counting is stopped and determination as to whether or not the number of times of performing the laundry weight sensing operation reaches a predetermined number is made. If the number of times of performing the laundry weight sensing operation does not reach the predetermined number, the rotation direction of the motor 72 is changed (222) and the laundry weight sensing operation is repeated in the changed motor rotation direction. The rotation direction of the motor may be changed when the weight sensing operation is repeatedly performed.

If the number of times of performing the laundry weight sensing operation reaches the predetermined number (Yes in Operation 220), the laundry weight is calculated by the accumulated count obtained by accumulating the numbers of pulses counted by the counter 18 when the motor is finally turned off in the respective operations (224).

According to the laundry weight sensing method of the embodiment of the present invention, since the motor 72 is consecutively turned on and off plural times so as to increase the counter electromotive force difference according to laundry weights, the laundry weight is accurately sensed using the accumulated count obtained by accumulating the numbers of pulses counted by the counter. Therefore, laundry weight sensing performance is improved.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A laundry weight sensing method comprising:
   performing an operation to drive a motor to drive a pulsator in an initial stoppage state up to a maximum rate of rotation, to turn off the motor so as to inertially rotate the motor, to drive the motor again before a rate of rotation of the motor reaches 0, and to turn off the motor again before the rate of rotation of the motor reaches a maximum rate of rotation so as to inertially rotate the motor until the motor is stopped,
   wherein laundry weight is sensed using counter electromotive force generated when the motor is turned off again.

2. The laundry weight sensing method according to claim 1, wherein the sensing of the laundry weight using the counter electromotive force is performed by estimating the laundry weight using a count of the number of pulses indicating the counter electromotive force generated when the motor is finally turned off.

3. The laundry weight sensing method according to claim 1, wherein, in the driving of the motor to drive the pulsator in the initial stoppage state up to the maximum rate of rotation, a motor driving time is determined at no load.

4. The laundry weight sensing method according to claim 1, wherein the driving of the motor again when the rate of rotation of the rotation reaches 0 includes driving the motor again before the rate of rotation of the motor reaches 0 at full load.

5. The laundry weight sensing method according to claim 1, wherein, in the turning off of the motor again before the rate of rotation of the motor reaches the maximum rate of rotation, a determination as to whether the rate of rotation of the motor is the maximum rate of rotation is made at no load.

6. The laundry weight sensing method according to claim 1, wherein:
   the driving of the motor again before the rate of rotation of the motor reaches 0 and the inertial rotation of the motor are performed plural times, and the motor is finally turned off so as to inertially rotate the motor until the motor is stopped, and
   the laundry weight is sensed using counter electromotive force generated when the motor is finally turned off.

7. The laundry weight sensing method according to claim 2, wherein:
   the number of pulses indicating the counter electromotive force generated when the motor is finally turned off is counted, and
   the laundry weight is estimated using an accumulated count obtained by accumulating the numbers of pulses counted when repeatedly performing the operation predetermined times.

8. The laundry weight sensing method according to claim 7, wherein a motor rotation direction is changed when the operation is repeatedly performed the predetermined times.

9. A laundry weight sensing method comprising:
   performing an operation to drive a motor to rotate a pulsator in an initial stoppage state up to a maximum rate of rotation and to repeatedly turn on and off the motor plural times while maintaining a rate of rotation of the motor within a predetermined range; and
   sensing laundry weight using counter electromotive force generated by the motor when the motor is finally turned off.

10. The laundry weight sensing method according to claim 9, wherein the sensing of the laundry weight using the counter electromotive force includes estimating the laundry weight using a count of the number of pulses indicating the counter electromotive force generated when the motor is finally turned off.

11. The laundry weight sensing method according to claim 9, wherein, in the maintenance of the rate of rotation of the motor within the predetermined range, the rate of rotation of the motor is maintained between the maximum rate of rotation and 0 at any load.

12. The laundry weight sensing method according to claim 11, wherein, in the maintenance of the rate of rotation of the motor within the predetermined range, the motor is controlled to be driven such that the rate of rotation of the motor is equal to or less than the maximum rate of rotation at no load.

13. The laundry weight sensing method according to claim 11, wherein, in the maintenance of the rate of rotation of the motor within the predetermined range, the motor is controlled to be driven such that the rate of rotation of the motor is equal to or greater than 0 at full load.

14. The laundry weight sensing method according to claim 10, wherein:
   the number of pulses indicating the counter electromotive force generated when the motor is finally turned off is counted, and
   the laundry weight is estimated using an accumulated count obtained by accumulating the numbers of pulses counted when repeatedly performing the operation predetermined times.

15. The laundry weight sensing method according to claim 14, wherein a motor rotation direction is changed when the operation is repeatedly performed the predetermined times.

16. A laundry weight sensing method comprising:
(a) controlling a motor to turn on to drive a pulsator in to rotate in one direction for a first motor control period;
(b) controlling the motor to turn off for a second motor control period;
(c) controlling the motor to turn on for a third motor control period;
(d) controlling the motor to finally turn off; and
(e) counting the pulses of the motor indicating counter electromotive force current when the motor is finally turned off,
wherein laundry weight corresponds to the counter electromotive force current.

17. The laundry weight sensing method according to claim 16, further comprising:
if a time required for counting the pulses when the motor is finally turned off passes a fourth motor control period, stopping the counting and determining whether or not a number of times of performing a laundry weight sensing operation reaches a predetermined number; and
if the number of times of performing the laundry weight sensing operation does not reach the predetermined number, controlling the motor to change the rotation direction of the motor and repeating operations (a)-(e) with the changed motor rotation direction.

* * * * *